United States Patent [19]

Busch et al.

[11] 4,086,067

[45] Apr. 25, 1978

[54] POROUS SINTERED ABRASIVE ARTICLES AND METHOD OF MANUFACTURE

[75] Inventors: John Folts Busch; Stephen Morrison Freeman, both of Tiffin, Ohio

[73] Assignee: International Telephone and Telegraph Corporation, New York, N.Y.

[21] Appl. No.: 671,135

[22] Filed: Mar. 29, 1976

Related U.S. Application Data

[63] Continuation-in-part of Ser. No. 557,472, Mar. 12, 1975, abandoned.

[51] Int. Cl.² ............................................... B24D 3/34
[52] U.S. Cl. .................................. 51/296; 51/298 R; 51/309 R
[58] Field of Search ................ 51/295, 296, 298, 309, 51/307

[56] References Cited

U.S. PATENT DOCUMENTS

| | | | |
|---|---|---|---|
| 1,984,835 | 12/1934 | Kohl | 51/296 |
| 2,290,876 | 7/1942 | Heany | 51/309 |
| 2,877,103 | 3/1959 | Lane | 51/298 |
| 3,079,243 | 2/1963 | Ueltz | 51/298 |
| 3,387,957 | 6/1968 | Howard | 51/298 |
| 3,450,515 | 6/1969 | Amero | 51/309 |
| 3,454,385 | 7/1969 | Amero | 51/309 |

*Primary Examiner*—Donald J. Arnold
*Attorney, Agent, or Firm*—J. B. Raden; H. J. Holt

[57] ABSTRACT

Improved abrasive articles and methods for manufacturing such articles are disclosed. The articles include porous abrasive grains and abrasive wheels formed from such porous abrasive grains. Non-porous grains are formed from a mixture of abrasive material and burn-out material. Porous grains are formed then by removal of burn-out material when the non-porous grains are fired to form sintered porous abrasive grains. Grinding wheels and the like are then formed from the sintered porous abrasive grains.

16 Claims, No Drawings

POROUS SINTERED ABRASIVE ARTICLES AND METHOD OF MANUFACTURE

This is a continuation-in-part of copending application Ser. No. 557,472 filed Mar. 12, 1975 and now abandoned.

BACKGROUND OF THE INVENTION

1. Field of the Invention

This invention relates to improved abrasive grains, to the manufacture of abrasive grains and to articles composed of abrasive grains.

2. Description of the Prior Art

Two general types of man-made aluminous abrasives are well known in the art, being identifiable respectively as fused and sintered. Fused aluminous abrasive grains are produced commercially by crushing ingots of fused aluminous compositions and separating the resulting pieces, or grains, into the various sizes required by means of a series of sieves. Sintered abrasive grains are produced by milling an aluminous composition to a fine powder, wetting to produce a plastic msas, extruding the plastic mass into rods of desired cross-sectional size, cutting or granulating the rods and firing the grains to elevated temperatures below the melting point, or in place of extruding, pressing into a block which is then crushed to produce granular particles prior to firing.

The friability of the individual fused or sintered abrasive grains, that is, the ease with which they break down due to impact, can be varied by controlling the composition and the final size of the crystals making up the abrasive.

In the case of a fused abrasive, the size of the crystals is generally a function of the cooling rate from the molten state — slow cooling promoting larger crystals. In the case of a sintered abrasive, the size of the crystals is generally a function of the amount of grinding performed on the raw materials.

This difference plus the added strains and shear planes developed during crushing makes a fused abrasive generally more friable than a sintered abrasive of equivalent composition.

The lesser friability of sintered abrasives results in poorer grinding characteristics on carbon steel and cast iron than found when fused abrasive is used. The problem manifests itself in the form of loading of the grinding wheel which means a coating is formed on the grinding surface by metallic swarf, or bits of metal. As the coating builds up, the grinding action slows. To counter this effect, extremely high pressures have been applied in the past to sintered abrasive wheels to break down the coated layer and expose a fresh surface.

SUMMARY OF THE INVENTION

Objects of this invention include the production and use of improved sintered abrasive grains and articles formed from such grains. It is a particular object to produce sintered aluminous abrasive grains of such friability as will assure the grains will break down when in use as integral parts of grinding wheels to maintain clean cutting surfaces on the grinding wheels.

The foregoing and ancillary objects are accomplished by inducing pores into grains of sintered abrasive, during manufacture, where the pores are of sufficient size and number to allow the grains to chip and crack in a desired manner during grinding. This involves the introduction of sized pieces of coarse grit burn-out material such as, but not limited to pieces of paradichlorobenzene, crushed walnut sheels, pieces of cork, pieces of plastic, or mustard seeds. Other organic resins or plastics such as polyethylene, polyesters, polystyrene, polyamides, phenolic and urea-formaldehyde resins and rubbers such as neoprene and butadiene-styrene may also be used. Other combustible materials may also be used providing they can be prepared in the required size ranges, can be extruded when mixed in a paste with abrasive material and can be burned-out of grains of abrasive material without producing undesirable effects on the abrasive.

We have found that by introducing burn-out material having an average diameter between about 20 and 80 percent of the cross-sectional width of the grain and in an amount between about 3.5 and 20 volume percent of the grain into the grain granules, a superior abrasive grain is produced after firing. When this abrasive grain is incorporated into a grinding wheel, such as would be used in the snagging of carbon steel billets or other grinding operations, a wheel results which cuts freely and resists loading. In addition, pressure levels approximately equal to those employed with fused abrasive grinding wheels need not be exceeded. The breakdown of the grain or chipping of the grain provides sharp corners and edges, thereby maintaining a continuously renewed, fresh grinding surface for free cutting which avoids loading. Also, the coarse grit burn-out material, in leaving pores behind, enables bonding to be more tenacious through increased contact surface areas permitting better interlocking of the abrasive grains and the bonding material.

DESCRIPTION OF PREFERRED EMBODIMENTS

In the production of abrasives for use in the practice of the present invention, a high alumina abrasive composition is first prepared. A typical composition would consist of about 93% aluminum oxide with varying amounts of other materials. A batch of this aluminous abrasive material is ground in a mill using conventional procedures until the particles produced have an average size of less than three microns. If wet milled, this material is then dried or dewatered to prepare it for controlled moisturizing in subsequent stages.

The batch is placed in a Muller Mixer and rewet by alternately adding water and a selected quantity of burn-out material of selected size until a body with sufficient plastic consistency for extrusion is obtained. The body of material is then extruded to produce elongated bodies having a cross-sectional size as defined below, is dried, granulated and fired above 2000° F. The burn-out material will consist generally of between about 3.5 and 20 volume percent of the batch material (with a permissible variation of about ± 0.5 percent) and is generally selected of an average size between about 20 and 80 percent of the cross-sectional width of the extruded material.

In preferred embodiments, extrusion has included the production of material ranging in cross-sectional size from a coarse mesh of about 8 (0.096 to 0.106 in.) to a fine mesh of about 20 (0.039 to 0.049 in.). Granulating includes chopping the extruded pieces into short lengths without materially changing the cross-sectional size. The grains generally are cut to lengths between about ⅛ and 3/16 inch to produce grains retaining diameters substantially as defined above. Firing above 2000° F is maintained long enough to sinter the particles in the grains together and causes the burn-out material to burn. After the burn-out material is burned, pores are left in the grains having average diameters between about 20% and 80% of the cross-sectional diameter of the grains and occupying between about 3.5 and 20 volume percent of the grains, with small permissible additional variations, as indicated before.

The grains, after firing, are than mixed with suitable bonds and fillers and the resulting mixture is used to prepare resinoid bonded grinding wheels. Conventional bonds, such as phenolic resins, and conventional fillers such as iron pyrites and polyvinyl chloride may be used in formulating the mixture in a manner which is not critical to the present invention. The preferred wheels are made with phenolic resins, but it is possible to use other bonding materials such as alkyd resins, shellac or epoxy resins either alone or in combination with each other or with phenolic resins. After formulation, the mixture is pressed in a cold press at room temperature or in a hot press at a preferred pressure and at a temperature of about 350° F ± 10° for approximately 35 to 40 minutes to form a grinding wheel of desired size and shape. The grinding wheel is then cured by being soaked in an oven at a temperature of 350° to 400° F for about 16 hours with additional heat treatments of about 10 hours duration.

EXAMPLE 1

A high alumina abrasive composition was prepared in a conventional fashion by grinding in a wet ball mill until the particles produced had an average size of less than three microns. The material was then dried, or dewatered, to prepare it for controlled moisturizing in a subsequent stage.

After dewatering, the batch was rewet in a Muller Mixer by alternating additions of water and 18 grit paradichlorobenzene until a body with sufficient plasticity and about a 6 dry volume percent coarse burn-out material was obtained capable of being extruded. The body of material was then extruded to produce elongated bodies having a cross-sectional size of 12 mesh. The extruded material was then dried in an oven.

After the extruded material was dried, it was chopped into short lengths or grains, between about and 3/16 inch without materially changing the cross-sectional size. The grains were than fired at a temperature of 2300° F ± 50° to sinter the individual particles of the grains. The burn-out material was eliminated during the drying or sintering operation depending on the burn-out material to provide porous grains in the resulting sintered abrasive. It will be recognized that burn-out occurs at a temperature far below 2300° F and in a period of time which is short compared with the time required to sinter the grains.

After firing, the porous sintered grains were used in the preparation of bonded grinding wheels 12 inches in diameter, 2 inches thick and having a 3½ inch arbor hole. Bonds, including phenolic resins, and fillers, including iron pyrites, were used in formulating a mixture which, except for the presence of the porous grains, represents a conventional mixture which is pressed at a temperature of about 350° ± 10° F for approximately 35 to 40 minutes to form a desired grinding wheel. The grinding wheel was then cured by cooking in an oven at a temperature of about 390° ± 10° F for about 16 hours. Additional heat treatment at other temperatures for a period of about 10 hours duration were also provided. These heat treatments are not unique to the present invention, but have been used in the formulation of other wheels such as the control wheels referred to as "sintered standard" in Tables I and II.

For comparison, wheels were also made in similar fashion from the same hot press formulation by employing the most effective fused abrasive available, namely, an alumina/zirconia abrasive, and with an identical sintered abrasive without pore induction. Grinding tests were then run both at constant pressure and constant power at 12,500 surface feet per minute on type 1015 carbon steel. Tables I and II contain data showing the results.

TABLE I

| | Grinding Results - Constant Power | | | |
|---|---|---|---|---|
| Grain | W=Wheel Loss (in 3/hr.) | S=Steel Removal (1lbs./hr.) | Ratio (S/W) | Pressure Range (Gauge) |
| Sintered Standard | 39.5 | 135.5 | 3.43 | 450 – 680 |
| Fused Standard | 38.8 | 142.6 | 3.68 | 450 – 650 |
| Sintered Pore Induced | 27.6 | 163.1 | 5.92 | 480 – 650 |

TABLE II

| | Grinding Results - Constant Pressure | | | |
|---|---|---|---|---|
| Grain | W=Wheel Loss (in 3/hr.) | S=Steel Removal (lbs./hr.) | Ratio (S/W) | Pressure (Gauge) |
| Sintered Standard | 29.7 | 143.5 | 4.83 | 540 |
| Fused Standard | 34.8 | 160.1 | 4.60 | 540 |
| Sintered Pore Induced | 38.6 | 213.2 | 5.52 | 540 |

As can be seen from the data in Tables I and II, wheels employing grains according to the invention were significantly superior to either the standard sintered abrasive or the fused abrasive wheels in both rate of cut and steel removal per unit wheel loss under all test conditions.

EXAMPLE 2

A high alumina abrasive composition was prepared in a conventional fashion by grinding in a wet ball mill until the particles produced had an average size of less than three microns. The material was then dried, or dewatered, to prepare it for controlled moisturizing in a subsequent stage.

After dewatering, the batch was rewet in a Muller Mixer by alternating additions of water and 18 grit granulated cork until a body with sufficient plasticity and about a 12.5 dry volume percent coarse burn-out material was obtained capable of being extruded. The body of material was then extruded to produce elongated bodies having a cross-sectional size of 14 mesh. The extruded material was then dried in an oven.

After the extruded material was dried, it was chopped into short lengths, or grains, between about ⅛ and 3/16 inch without materially changing the cross-sectional size. The grains were then fired at a temperature of 2300° ± 50° F to sinter the individual particles of the grains. The burn-out material was eliminated during the drying or sintering operation depending on the burn-out material to provide porous grains in the resulting sintered abrasive. Again, it should be noted that burn-out occurs at a temperature far below 2300° F and in a period of time which is short compared with the time required to sinter the grains.

After firing, the porous sintered grains were used in the preparation of bonded grinding wheels 12 inches in diameter, 2 inches thick and having a 3½ inch arbor hole. Bonds, including phenolic resins, and fillers were used in formulating a mixture which, except for the presence of the porous grains, represents a conventional mixture which is pressed at room temperature of about 70° F for a few seconds to form a desired grinding wheel. The grinding wheel was then cured by cooking in an oven at a temperature between about 345° and 365° F for about 42 hours. These heat treatments are not unique to the present invention, but have been used in the formulation of other wheels such as the control wheels referred to as "sintered standard" in Tables I, II and III.

For comparison, wheels were also made in similar fashion from the same cold press formulation, but employing the most effective fused abrasive available, namely, an alumina/zirconia abrasive, and with an identical sintered abrasive without pore induction. Grinding tests were run at constant power at 12,500 surface feet per minute on Type 1015 carbon steel. Table III contains data showing the results.

TABLE III

| Grain | W = Wheel Loss (In³/Hr.) | S = Steel Removal (Lbs./Hr.) | Ratio S/W |
| --- | --- | --- | --- |
| Sintered Standard | 36.9 | 57.6 | 1.56 |
| Fused Standard | 43.8 | 77.2 | 1.78 |
| Sintered Pore Induced | 42.5 | 76.8 | 1.81 |

As can be seen from the data in Table III, the wheels employing grains according to the invention were superior in rate of cut and steel to wheel ratios to the standard sintered abrasive and equal in all respects to the fused alumina/zironia abrasive.

While the principles of the invention have been described above in connection with specific methods, apparatus and applications, it is to be understood that this description is made only by way of example and not as a limitation on the scope of the invention.

We claim:

1. A porous sintered abrasive grain formed from a mixture of aluminous abrasive material and burn-out material, where said burn-out material may be selected from pieces of material such as paradichlorobenzene, crushed walnut shells, cork, plastic and mustard seeds, said burn-out material having a cross-section lying between about 20 and 80 percent of the grain cross-section and being present in the mixture in a volume percent between about 3.5 and 20.

2. The abrasive grain of claim 1, in which the abrasive material consists essentially of aluminous oxide.

3. The abrasive grain of claim 1 in which the abrasive material includes aluminum oxide.

4. The abrasive grain of claim 1, in which the abrasive grain is in a range of sizes between about 8 grit and 20 grit.

5. The abrasive grain of claim 4, in which the abrasive material consists essentially of aluminous oxide.

6. The abrasive grain of claim 4 in which the abrasive material includes aluminum oxide.

7. An organic resin bonded grinding wheel comprising a plurality of the sintered aluminous abrasive grains of claim 1.

8. The grinding wheel of claim 7, in which the abrasive grains include aluminum oxide.

9. The grinding wheel of claim 7, in which the abrasive grains are formed of aluminous oxide.

10. A method for forming porous abrasive grains comprising forming a mixture of burn-out material and aluminous abrasive material, said burn-out material being in an amount between about 3.5 and 20 volume percent of the volume of the abrasive particles, said burn-out material being formed of pieces of such substances as paradichlorobenzene, crushed walnut shells, cork, plastic and mustard seeds, forming grains from said mixture, said burn-out material having a cross-section between about 20 and 80 percent of the cross-section of the grains, and firing said grains at a temperature above 2000° F. to thereby eliminate the burn-out material, provide pores in said grains and sinter the grains.

11. The method of claim 10 including the steps of combining said burn-out material, said abrasive material and water to form a body of material of a plastic consistency suitable for extrusion, forming extruded bodies from said body of material and forming granulated bodies from said extruded bodies.

12. The method of claim 11 including the step of extruding said body of material to produce extruded material having a cross-sectional size in the range between about 8 grit and 20 grit.

13. A method for producing abrasive wheels comprising forming a plurality of porous sintered aluminous abrasive grains from a mixture of burn-out material and abrasive material, said burn-out material being in an amount between about 3.5 and 20 volume percent of the volume of the abrasive particles and of a size between about 20 and 80 percent of the cross-section desired for the grains, firing said abrasive grains at a temperature above 2000° F. to sinter them and induce pores therein, bonding with an organic resin a quantity of said grains in a hot press at about 350° F. to form a wheel and curing said wheel at a temperature of about 390° F.

14. The method of claim 13 in which the burn-out material is formed of pieces of such materials as paradichlorobenzene, crushed walnut shells, cork, plastic or mustard seeds.

15. A method for producing abrasive wheels comprising forming a plurality of porous sintered aluminous abrasive grains from a mixture of burn-out material and abrasive material, said burn-out material being in an amount between about 3.5 and 20 volume percent of the volume of the abrasive particles and of a size between about 20 and 80 percent of the cross-section desired for the grains, firing said abrasive grains at a temperature above 2000° F. to sinter them and induce pores therein, bonding with an organic resin a quantity of said grains in a cold press at room temperature to form a wheel and curing said wheel at a temperature between about 340° and 360° F.

16. The method of claim 15 in which the burn-out material is formed of pieces of such materials as paradichlorobenzene, crushed walnut shells, cork, plastic or mustard seeds.

* * * * *